Dec. 23, 1952   H. A. GARMERS   2,622,325
MATRIX CLAMP
Filed June 5, 1950
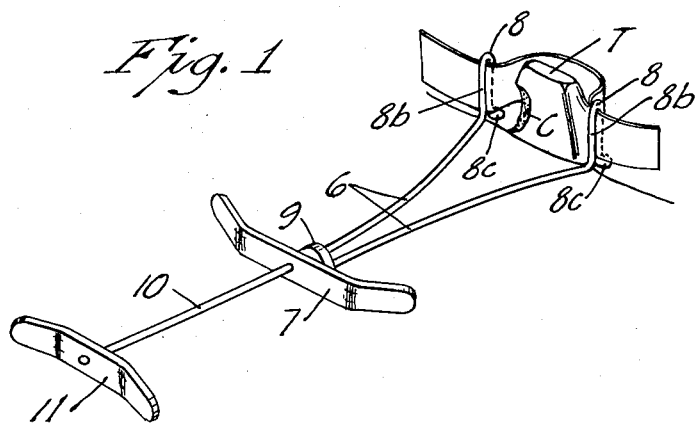
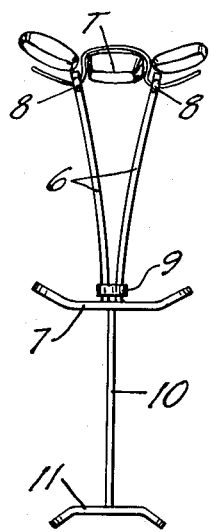
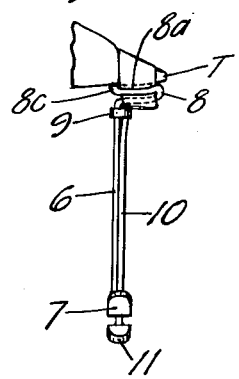
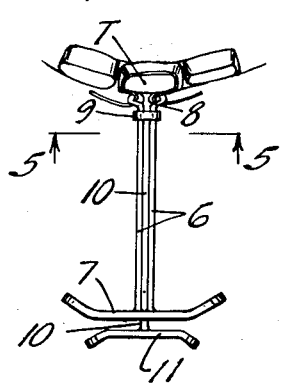
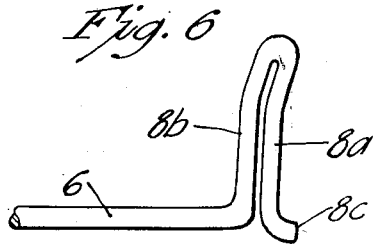
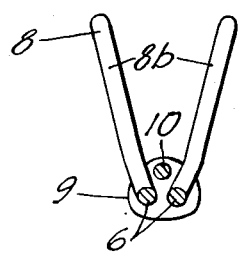
Inventor
Herman A. Garmers
By Williamson & Williamson
Attorneys Patented Dec. 23, 1952

2,622,325

UNITED STATES PATENT OFFICE 2,622,325

MATRIX CLAMP

Herman A. Garmers, Minneapolis, Minn.

Application June 5, 1950, Serial No. 166,132

3 Claims. (Cl. 32—63)

This invention relates to matrix clamps.

In recent years the development of dental fillings made from plastic material which polymerizes (sets) very rapidly it has been a problem to satisfactorily form these plastic fillings after insertion into the tooth cavity without producing a relatively large amount of excess. Plastic fillings are primarily used in the anterior teeth and this fast setting material requires quick positioning of the matrix strip in tightly embracing position around the filled tooth to quickly form the plastic material to the contour of the tooth and remove substantially all of the excess filler material.

It is an object of my invention to provide a matrix clamp adapted to hold a matrix strip between the jaws thereof when said jaws are in open spread relation and the strip is mounted around a portion of the tooth without covering the cavity to be filled, thus permitting the plastic material to be inserted into the cavity while the matrix strip is disposed in position preparatory to being subsequently clamped tightly about the tooth by closing the jaws of the clamp.

It is another object to provide a matrix clamp adapted to be quickly and easily closed by a single straight line operation thereof to prevent lateral shifting of the strip held between said jaws while permitting quick and positive tightening of the strip around the tooth to shape the plastic filling to the contour of the tooth.

It is still a further object to provide clamping jaws for securely gripping spaced portions of an elongated matrix strip, said jaws being shaped to conform generally to the labial contour of anterior teeth and being somewhat flexibly mounted to permit conformity of the strip to the contour of the tooth.

It is another object to provide a clamping jaw for a matrix clamp constructed to conform to the labial contour of anterior teeth and provided with outwardly projecting retaining elements at the end portions thereof to engage the base portion of the labial contour of a tooth when said jaws are in clamped relation to prevent shifting movement of the matrix strip longitudinally of the tooth during the curing or polymerization of the plastic material.

These and other objects and advantages of my invention will more fully appear from the following description made in connection with the accompanying drawings wherein like reference characters refer to similar parts throughout the several views and in which:

Fig. 1 is a perspective view of my clamp with a matrix strip retained in the open jaws thereof and mounted around only the lingual portion of an anterior tooth;

Fig. 2 is a top plan view of the structure shown in Fig. 1;

Fig. 3 is a top plan view of the structure shown in Fig. 1 with the jaws in tightly clamped relation;

Fig. 4 is a side elevational view of the clamp in clamped position and showing the strip in dotted lines;

Fig. 5 is a vertical sectional view taken substantially along the line 5—5 of Fig. 3, showing the conformity of the jaws to the tapered contour of the tooth; and Fig. 6 is a fragmentary enlarged side elevation showing the matrix gripping jaws in detail.

As illustrated in the accompanying drawings I provide a matrix clamp having a pair of elongated normally divergent resilient jaw carrying arms 6 which are securely connected in closely spaced relation at their rear ends as by a transversely disposed gripping and guiding element 7. A pair of matrix gripping jaws 8 are respectively mounted at the forward ends of arms 6 and these jaws, in the form illustrated, are substantially U-shaped, as best shown in Figs. 4 and 6. These substantially U-shaped matrix gripping jaws each have a forward gripping arm 8a concavely shaped to conform to the labial contour of the anterior teeth and a rear gripping arm 8b also concavely shaped to lie substantially parallel with the outer gripping arm in closely spaced side by side relation thereto. The free ends of the outer gripping arms each have a forwardly extending projection 8c which engages the base portion of the labial side of the tooth and prevents the matrix strip and clamp from sliding off the tooth when the same are in clamping tooth-embracing position thereon, as best shown in Fig. 4.

A clamping element, such as the clamping slide 9, slidably embraces at least the outer portion of the two normally divergent clamping arms 6 and a plunger 10 is fixed thereto and extends rearwardly therefrom and has a pressure applying element 11 fixed to the rear end thereof. In the form shown the plunger is guided by inserting it through an aperture in the hand gripping member 7 and by the slide 9.

The following is a description of the operation of my improved matrix clamp. The matrix strip is initially inserted between the gripping arms of the jaws 8 and when the same are in spread relation and after the cavity of the tooth has been prepared to receive the filling material the portion of the matrix strip disposed between the jaws 8 is mounted around the lingual side of the tooth and the spread jaws will permit the filling material to be inserted into the cavity, such as the cavity C in the tooth T of the drawing. As soon as the material has been packed into the cavity the matrix strip is tightened around the tooth by applying longitudinally directed pressure against the member 11 to shift the plunger 10 and clamping slide 9. As the slide 9 shifts downwardly along the clamp jaw carrying arms 6 said arms are progressively swung together into clamping position, as shown in Figs. 3, 4 and 5, and the retaining projections 8c engage the relatively sharply curved base portion adjacent the gum line of the tooth on the labial side thereof, as best shown in Figs. 4 and 5. The ends of the forward arms 8a having the projections 8c formed thereon are disposed in close side by side relation, as best shown in Fig. 5, and the closed ends of the U-shaped jaws diverge outwardly therefrom due to the tension of the matrix strip and the taper of the anterior teeth. This diverging of the closed ends of the U-shaped jaws is permitted by the resilient elongated clamping arms which twist slightly as torque is applied thereto by the tension of the matrix strip.

It will be seen that I have provided an extremely simple, yet highly efficient matrix clamp adapted to quickly and easily clamp a matrix strip around an anterior tooth after a plastic filling material has been inserted therein. The matrix strip can be initially positioned around the lingual portion of the tooth before the filling material is inserted into the cavity and thereafter by a purely straight line movement of the plunger the two jaws gripping the matrix strip will be tightly clamped together about the tooth and retained in clamping position during the curing of the filling material.

It will, of course, be understood that various changes may be made in the form, details, arrangement and proportions of the parts without departing from the scope of my invention.

What I claim is:

1. A matrix clamp having in combination a pair of substantially U-shaped normally spaced apart opposed jaws, each comprising two gripping arms joined at one end, jaw carrying member fixed to the other end of each of said gripping arms, means for clamping the jaw carrying members into close association to tightly clamp said jaws together, each of said jaws being adapted to retain a matrix strip between the gripping arms thereof.

2. The structure set forth in claim 1 and the forward arms of the jaws being curved to conform to the labial contour of an anterior tooth, and each said arms having a forwardly extending projection element at the free end thereof, said projection elements being constructed and of a shape to securely engage the outwardly extending labial base portion of a tooth and firmly retain the jaw members and a matrix strip held therebetween in close association to the tooth when jaw carrying members are clamped together and prevent shifting movement of said strip longitudinally of the tooth.

3. A matrix clamp comprising a pair of normally divergent arms, a connector element for interconnecting the rear ends of said arms, a clamping slide slidably mounted for longitudinal shifting movement on said arms and constructed to slidably engage the outer side portions of the arms to clamp the forward ends thereof together when projected downwardly thereon, a plunger fixed at its forward end to said slide and having a pressure applying element at the rear end thereof to facilitate forward projection of said slide, and a pair of matrix gripping jaws constructed of substantially U-shaped members, one of the free ends of said U-shaped members being respectively connected at the forward ends of said normally divergent resilient arms, said gripping jaw members being adapted to receive a highly flexible matrix strip therein to tightly grip the same, said arms permitting lateral divergent swinging movement of the closed ends of said U-shaped jaws when the same are in clamping position about a tooth to permit conformity of the strip to the tapered contour of the tooth.

HERMAN A. GARMERS.

REFERENCES CITED

The following references are of record in the file of this patent:

UNITED STATES PATENTS

| Number | Name | Date |
|---|---|---|
| 348,628 | Hewett | Sept. 7, 1886 |

FOREIGN PATENTS

| Number | Country | Date |
|---|---|---|
| 144,538 | Austria | Aug. 15, 1935 |